US 6,889,244 B1

(12) United States Patent
Gaither et al.

(10) Patent No.: US 6,889,244 B1
(45) Date of Patent: May 3, 2005

(54) METHOD AND APPARATUS FOR PASSING MESSAGES USING A FAULT TOLERANT STORAGE SYSTEM

(75) Inventors: Blaine D. Gaither, Fort Collins, CO (US); Bret A. McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 09/703,427

(22) Filed: Oct. 31, 2000

(51) Int. Cl.[7] .............................................. G06F 15/16
(52) U.S. Cl. ........................ 709/202; 709/206; 709/213
(58) Field of Search ......................................... 709/213

(56) References Cited

U.S. PATENT DOCUMENTS

| | | | | | |
|---|---|---|---|---|---|
| 5,555,346 | A | * | 9/1996 | Gross et al. | 706/45 |
| 5,694,541 | A | * | 12/1997 | Service et al. | 714/46 |
| 5,790,789 | A | * | 8/1998 | Suarez | 709/202 |
| 5,815,649 | A | * | 9/1998 | Utter et al. | 714/6 |
| 6,430,177 | B1 | * | 8/2002 | Luzeski et al. | 370/356 |
| 6,546,413 | B1 | * | 4/2003 | Northrup | 709/200 |
| 6,574,655 | B1 | * | 6/2003 | Libert et al. | 709/200 |

* cited by examiner

*Primary Examiner*—Marc D. Thompson
(74) *Attorney, Agent, or Firm*—David A. Plettner

(57) ABSTRACT

A method and apparatus pass messages between server and client applications using a fault tolerant storage system (FTSS). The interconnection fabric that couples the FTSS to the computer systems that host the client and server applications may also be used to carry messages. A networked system capable of hosting a distributed application includes a plurality of computer systems coupled to an FTSS via an FTSS interconnection fabric. The FTSS not only processes file-related I/O transactions, but also includes several message agents to facilitate message transfer in a reliable and fault tolerant manner. The message agents include a conversational communication agent, an event-based communication agent, a queue-based communication agent, a request/reply communication agent, and an unsolicited communication agent. The highly reliable and fault tolerant nature of the FTSS ensures that the FTSS can guarantee delivery of a message transmitted from a sending computer system to a destination computer system. As soon as a message is received by the FTSS from a sending computer system, the message is committed to a nonvolatile fault tolerant write cache. Thereafter, the message is written to a redundant array of independent disks (RAID) of the FTSS, and processed by one of the message agents.

10 Claims, 10 Drawing Sheets

METHOD AND APPARATUS FOR PASSING MESSAGES USING A FAULT TOLERANT STORAGE SYSTEM

CROSS REFERENCE TO RELATED APPLICATION

This application contains subject matter related to a co-pending application entitled "A Fault Tolerant Storage System Having an Interconnection Fabric That Also Carries Network Traffic" by Blaine D. Gaither et al., change to Ser. No. 09/703,428. This application is hereby incorporated by reference, is assigned to the same assignee as the present application, and was filed on Oct. 31, 2000, which is also the date on which the present application was filed.

FIELD OF THE INVENTION

The present invention relates to messaging between computer systems. More specifically, the present invention relates to a messaging architecture wherein messages are transmitted over the interconnection fabric of a fault tolerant storage system and are stored within the fault tolerant storage system.

DESCRIPTION OF THE RELATED ART

In the art of computing, a distributed application is an application that is separated into two or more parts, such as a client application on a first computer system and a server application on a second computer system, with the two computers coupled together via a network. As used herein, the term "client" refers to an entity that requests a service, and the term "server" refers to the entity that fulfills the request. The entity can be a an application, i.e., a client application or a server application, or the entity can be a computer system coupled to a network, i.e., a client computer system or a server computer system. Computer systems coupled to a network may also be referred to as "nodes". The meaning of these terms will be apparent from the contexts in which the terms are used.

Consider, for example, a distributed application that allows a customer to order a product over the Internet from an on-line retailer. The customer accesses the distributed application using a web browser. The web browser communicates over the Internet with a web server, which provides the customer with a catalog of products that can be ordered, and provides a "shopping basket" that allows the customer to select the products that the customer wishes to purchase.

Assume that the customer decides to complete the order, and pay for the order with a credit card. The web server must communicate as a client with a server application that verifies that the credit card is valid, and posts the purchase to the customer's credit card account. The web server must also communicate with an application that delivers the order to the warehouse so the order can be shipped. In addition, the web server may communicate with an inventory control application to verify that the products ordered are in stock, and to order replacement inventory from the vendor. If the customer checks back latter to view the status of the order, the web server may communicate with an application maintained by the shipping company to provide the customer with a tracking number.

This is a very simple example, and a typical distributed application may be much more complex. However, even in this simple example one can see that designing a distributed application is very complex. Perhaps the most complex task faced by a distributed application developer is ensuring that all the disparate applications that comprise the distributed application communicate in a seamless and reliable manner.

To ensure that all applications communicate seamlessly and reliably in a distributed application, the application designer may use a middleware product that distributes applications across multiple platforms, databases, and operating systems using message-based communications and, if desired, distributed transaction processing. Middleware products are used with client server applications to distribute processing among multiple servers, manage distributed transactions, and integrate multiple database platforms. Middleware systems are sometimes known in the art as "on-line transaction processing" (OLTP) systems. One such system is Bea Tuxedo®, which is a product of BEA Systems, Inc.

To facilitate communication between disparate applications, Bea Tuxedo® provides an application designer with a series of messaging paradigms. These messaging paradigms are conversational communication, event-based communication, queue-based communication, request/reply communication, and unsolicited communication.

Conversational communication allows messages to be exchanged between clients and servers in a manner analogous to human conversation. This form of communication is implemented using inter-process communication (IPC) message queues. IPC message queues are typically implemented in transient memory areas, and are typically provided by the underlying operating system and are used for communication between clients and servers. IPC message queues can be used to pass messages between client and server applications operating on the same computer system or on separate computer systems coupled by a network.

Just as in a conversation between two people, a number of messages pass back and forth between the client and server until a conclusion is reached. Over the course of the communication, both sides "remember" the point (or state) of the conversation so that relatively long operations, such as ad hoc queries, reports, and file transfers, can be supported. Note that the context of any particular message is interpreted in view the previous messages comprising the conversation.

Event-based communication uses an event broker to transfer messages. The event broker provides a communication paradigm in which message suppliers can post messages for message subscribers. Because client and server processes that use the event broker communicate with one another based on a set of subscriptions, this paradigm is also known in the art as publish-and-subscribe communication. The event broker acts like a newspaper delivery person who delivers newspapers only to customers who have paid for a subscription. Event generators inform the event broker of events (such as changes and problems) as they occur. This process is called posting an event. The event broker then matches the name of the event to an event name associated with a list of subscribers, and notifies each subscriber on the list of the event by passing a message to the subscriber. Communication between the suppliers, subscribers, and event broker is provided by IPC message queues.

Queue-based communication requires persistent storage of data. Queue-based communication allows any client or server to store messages in queues, and guarantees that any stored message will be delivered to the destination. Queues can be ordered as last-in first-out (LIFO) or first-in first-out (FIFO), or on the basis of time or priority. A collection of queues is administered and referred to as a single entity known as a queue space.

Queue-based communication is appropriate when communication can occur in a time-independent fashion. Time-independence is a characteristic of programs that operate independently from one another and do not need to synchronize their communications simultaneously. Time-independent programs synchronize with each other by leaving messages in application queues. Because queued messages are stored using persistent media, such as a hard disk drive, queue-based communication is highly reliable and messages can even be delivered after failures, such as power outages or network interruptions.

Even though queue-based messages pass through persistent storage, server applications and client applications enqueue and dequeue messages by sending the messages to a queue administrator. The queue administrator can reside on the same computer as either the server or client application, or can reside on a third server.

Request/reply communication is also implemented using inter-process communication (IPC) message queues. Each server is assigned an IPC message queue called a request queue, and each client is assigned an IPC message queue called a reply queue. Accordingly, a client application can send requests to the server by putting those requests on the server's queue, and then check and retrieve messages from the server by retrieving messages from its own reply queue.

Request/reply communication is typically carried out in either a synchronous mode or an asynchronous mode. In a synchronous mode, a client sends a request to a server, which performs the requested action while the client waits. The server then sends the reply to the client, which receives the reply. In asynchronous mode, the client does not wait for a server to complete a service request before the client undertakes other tasks. Rather, after issuing a request, the client performs additional tasks (which may include issuing more requests to the server). When a reply to the first request is available, the client retrieves it from its reply queue.

Unsolicited communication is a type of communication that allows a client or server to receive a message that it never requested, thereby making it possible for applications to receive notification of application-specific events as they occur without having to request notification. Unsolicited messages can be sent to a single server node or client node, or be broadcast to a group of nodes. For example, a server may alert a single client that the account about which the client is inquiring has been closed, or a server may send a message to all the clients to notifying the clients that the server will be shut down for maintenance at a specific time. In addition, unsolicited messages can be sent either with or without guaranteed delivery. Unsolicited messages are sent using IPC message queues.

As can be seen from the discussion above, some of these messaging paradigms, such as request/reply communication, use transient media, such as network connections and system memory, to pass messages between clients and servers. On the other hand, queue-based communication delivers messages using persistent media, such as a hard disk drive.

In most distributed applications, availability is very important. Consider the example above, if the application that processes credit card transactions suffers a failure, the customer will not be able to purchase products. Similarly, if the web server can not communicate with the inventory control application, the web server can not inform the customer whether the product is in stock.

To ensure that a distributed application has a high rate of availability, it is important to make each component that hosts the distributed application as reliable and fault-tolerant as possible. As discussed above, messaging is critical in a distributed application, and two components critical in the communication of messages are the persistent storage media, such as the hard drives, and the transient communication network. Accordingly, a designer of a distributed application will often specify that the application be implemented using highly reliable and fault tolerant interconnection fabrics and storage systems.

Several interconnection fabrics are available to provide guaranteed delivery of packets. For example, ServerNet® is a system interconnect architecture available from Compaq Computer Corporation. ServerNet® hardware ensures data integrity using multiple techniques. For example, command link integrity isolates single-bit errors, cyclic redundancy checks maintain both data and control integrity of transfers crossing the interconnect fabric, and hardware protocol acknowledgments ensure that end-to-end reliable data transfer has occurred. In addition, ServerNet® is capable of providing a high level of availability by incorporating spare alternate paths within a primary interconnection fabric, and providing a fully redundant secondary interconnect fabric with redundant secondary attachments to network nodes. Similar interconnection fabrics are available from other vendors, such as the Coupling Facility provided by IBM Corporation. While interconnection fabrics such as ServerNet® and the Coupling Facility are fast, highly reliable, and fault tolerant, they are also very expensive.

A fault tolerant storage systems (FTSS), such as the SureStore® XP512 Disk Array, which is a product of Hewlett-Packard Company, guarantees the availability and integrity of files stored by the FTSS. Fault tolerant storage systems are also available from other companies, such as Hitachi Data Systems Corporation and EMC Corporation.

Typically an FTSS is coupled to a server using a high-speed interface, such as an Ultra160 SCSI interface, a fiber channel interface, or an enterprise system connectivity (ESCON) interface. Such systems are highly reliable and fault tolerant. For example, the SureStore® XP512 Disk Array uses a fault-tolerant, redundant architecture that ensures there is no single point-of-failure, and has a mean time between failure (MTBF) of 2.5 million hours, or alternatively 285 years. Such systems are also incredibly fast. A single fiber channel port can support transfer rates of 100 megabytes per second, and ports can be ganged together to increase transfer rates even further. Moreover, the internal crossbar architecture of the XP512 has a bandwidth of 6.4 gigabytes per second.

FIG. 1 shows such a highly reliable fault-tolerant prior art system 58, which may be used to host a distributed application. System 10 comprises computer systems 12, 14, 16, 18, 20, and 22, and fault tolerant storage system (FTSS)24. Computer systems 12, 14, 16, 18, 20, and 22 are coupled to FTSS 24 via FTSS interconnection fabric 28 to carry file 110 transactions between the computer systems and FTSS 24. Typically, interconnection fabric 28 couples each computer system directly to the FTSS, but does not directly couple the computer systems to each other. In addition, computer systems 12, 14, 16, 18, 20, and 22 are coupled to together by highly reliable, fault tolerant network interconnection fabric 26 to carry messages between the computer systems.

Note that interconnection fabrics 26 and 28 are both highly reliable and fault tolerant. Accordingly, a customer configuring a system such as that shown in FIG. 1 ends up paying for two interconnection fabrics. Furthermore, interconnection fabric 26 does not include any type of persistent storage. If a client suffers some type of error after receiving a message, the client is not able to request retransmission of the message from fabric 26. What is needed in the art is a practical way for a customer to use the same highly reliable and fault tolerant interconnection fabric to carry both file I/O transactions and messaging traffic, and also allowing a client to request retransmission of messages.

SUMMARY OF THE INVENTION

The present invention is a method and apparatus for passing messages between server and client applications using a fault tolerant storage system (FTSS). The interconnection fabric that couples the FTSS to the computer systems that host the client and server applications may also be used to carry messages. In accordance with the present invention, a networked system capable of hosting a distributed application includes a plurality of computer systems coupled to an FTSS via an FTSS interconnection fabric. The FTSS not only processes file-related I/O transactions, but also carries message traffic. In addition, the FTSS includes several message agents to facilitate message transfer in a reliable and fault tolerant manner. The message agents include a conversational communication agent, an event-based communication agent, a queue-based communication agent, a request/reply communication agent, and an unsolicited communication agent.

The highly reliable and fault tolerant nature of the FTSS ensures that the FTSS can guarantee delivery of a message transmitted from a sending computer system to a destination computer system. As soon as a message is received by the FTSS from a sending computer system, the message is committed to a nonvolatile write cache. Thereafter, the message is written to a redundant array of independent disks (RAID) of the FTSS, and processed by one of the message agents.

The present invention enhances the reliability and fault tolerance of messaging in several ways. First, messages may be transmitted between nodes using the FTSS interconnection fabric, which is highly reliable and fault tolerant. Since many systems that host distributed applications already include an FTSS, using the FTSS fabric instead of a less reliable network media, such as Ethernet, increases availability of the distributed application without the customer having to incur additional hardware costs.

Second, in the prior art, several messaging paradigms use agents that operate on separate servers. By moving these agents to the FTSS, availability is increased because the FTSS is typically more reliable than the servers to which it is coupled. Furthermore, since the FTSS is being used to pass messages anyway, providing the agents in the FTSS eliminates the need to route the messages to a separate server, thereby allowing the messages to be processed faster.

Finally, several prior art messaging paradigms pass interprocess communication messages directly between nodes in a transient manner. In the present invention, these messages pass through the FTSS and are stored in and retained by the FTSS, thereby allowing any application to "rollback" to a known point and retrieve lost messages from the FTSS.

DETAILED DESCRIPTION OF THE PREFERRED EMBODIMENTS

The present invention is a method and apparatus for passing messages between server and client applications using a fault tolerant storage system (FTSS). The interconnection fabric that couples the FTSS to the computer systems that host the client and server applications may also be used to carry messages.

Figure 1:
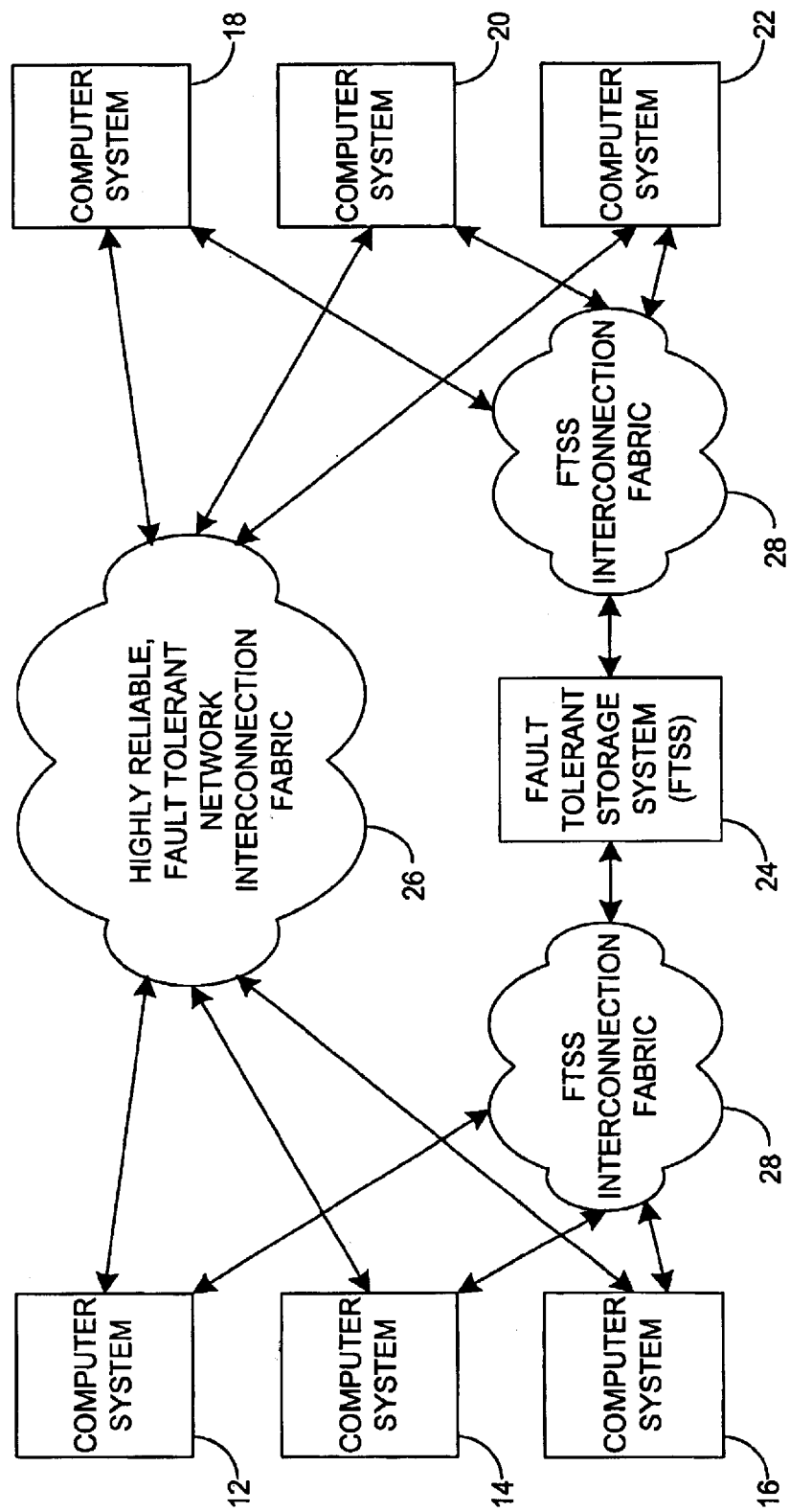
FIG. 1 shows a highly reliable fault-tolerant prior art system that may be used to host a distributed application.
Figure 2:
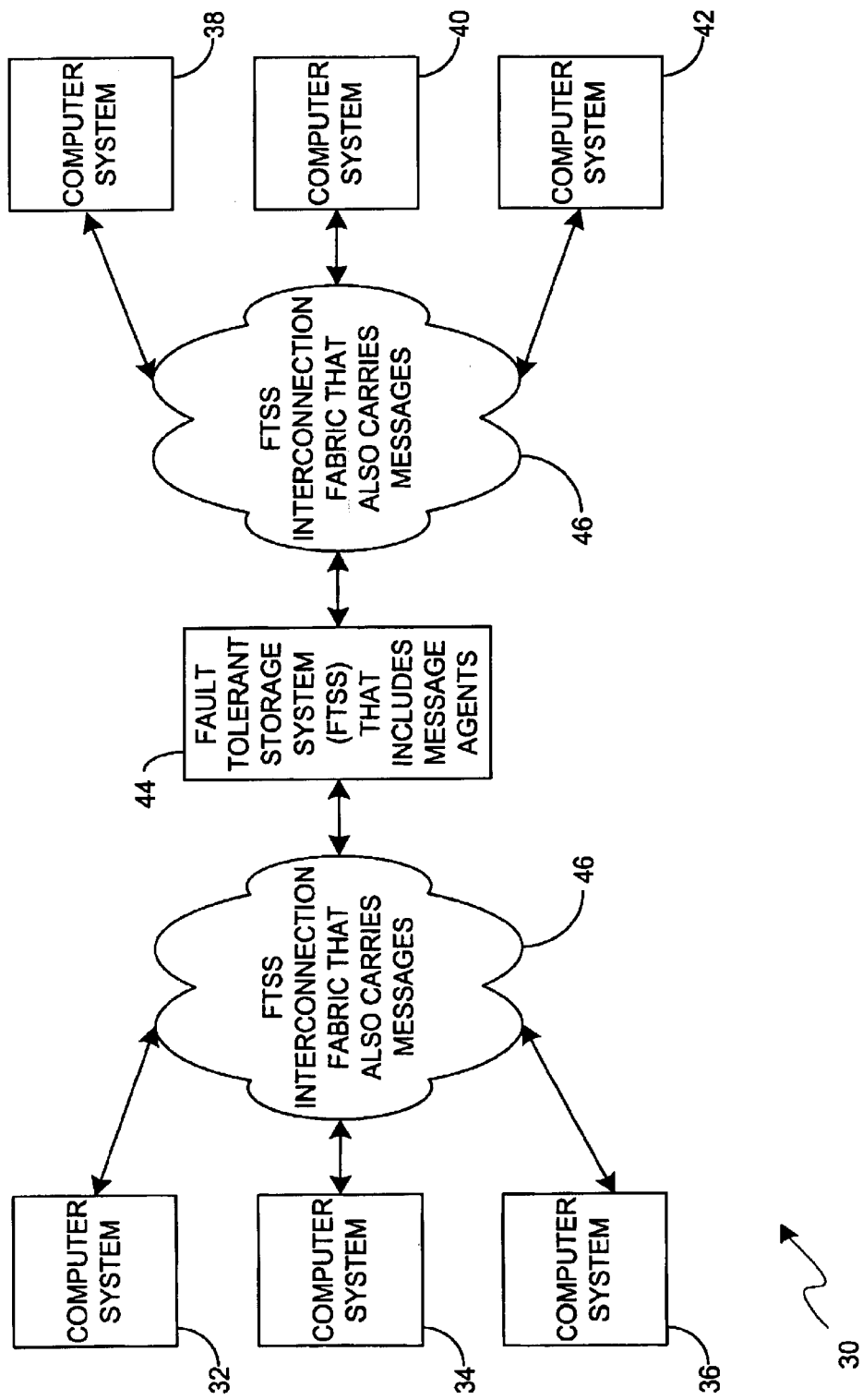
FIG. 2 shows a highly reliable fault-tolerant system in accordance with the present invention that may be used to host a distributed application.

FIG. 2 shows a networked system 30 in accordance with the present invention. Networked system 30 may be used to host a distributed application, such as an on-line store accessible from the Internet. System 30 includes computer systems 32, 34, 36, 38, 40, and 42, fault tolerant storage system (FTSS) 44, and FTSS interconnection fabric 46. Although only computer systems are shown in FIG. 2, those skilled in the art will recognize that other network nodes may be coupled to FTSS 44 via fabric 46, such as printers, scanners, backup systems, and the like. Although not shown in FIG. 2, computer systems 32, 34, 36, 38, 40, and 42 may be coupled to each other and to other computers via another interconnection fabric, such as an Ethernet network, which in turn may be coupled to the Internet via a gateway.

Typically, interconnection fabric 46 will be comprised of high-speed interfaces and related cabling used to connect computer systems to storage systems, such as small computer system interfaces (SCSI), fiber channel interfaces, or enterprise system connectivity (ESCON) interfaces. In a typical FTSS, these interfaces tend to connect each computer system directly to the FTSS, but do not connect the computer systems to each other.

In accordance with the present invention, FTSS 44 not only processes file-related I/O transactions, but also carries message traffic. In addition, FTSS 44 includes several message agents to facilitate message transfer in a reliable and fault tolerant manner, as described below. The highly reliable and fault tolerant nature of FTSS 44 ensures that FTSS 44 can guarantee delivery of a message transmitted from a sending computer system to a destination computer system. To see how this is accomplished, first consider a typical FTSS, such as the SureStore® XP512 Disk Array, which is a product of Hewlett-Packard Company. The XP512 has a battery-protected fully redundant nonvolatile write cache that can range in size from 2 gigabytes to 32 gigabytes. As soon as a message is received by FTSS 44 from a sending computer system, the message is committed to the nonvolatile write cache. Thereafter, the message is written to a redundant array of independent disks (RAID) of FTSS 44, and processed by one of the message agents.

Figure 3:
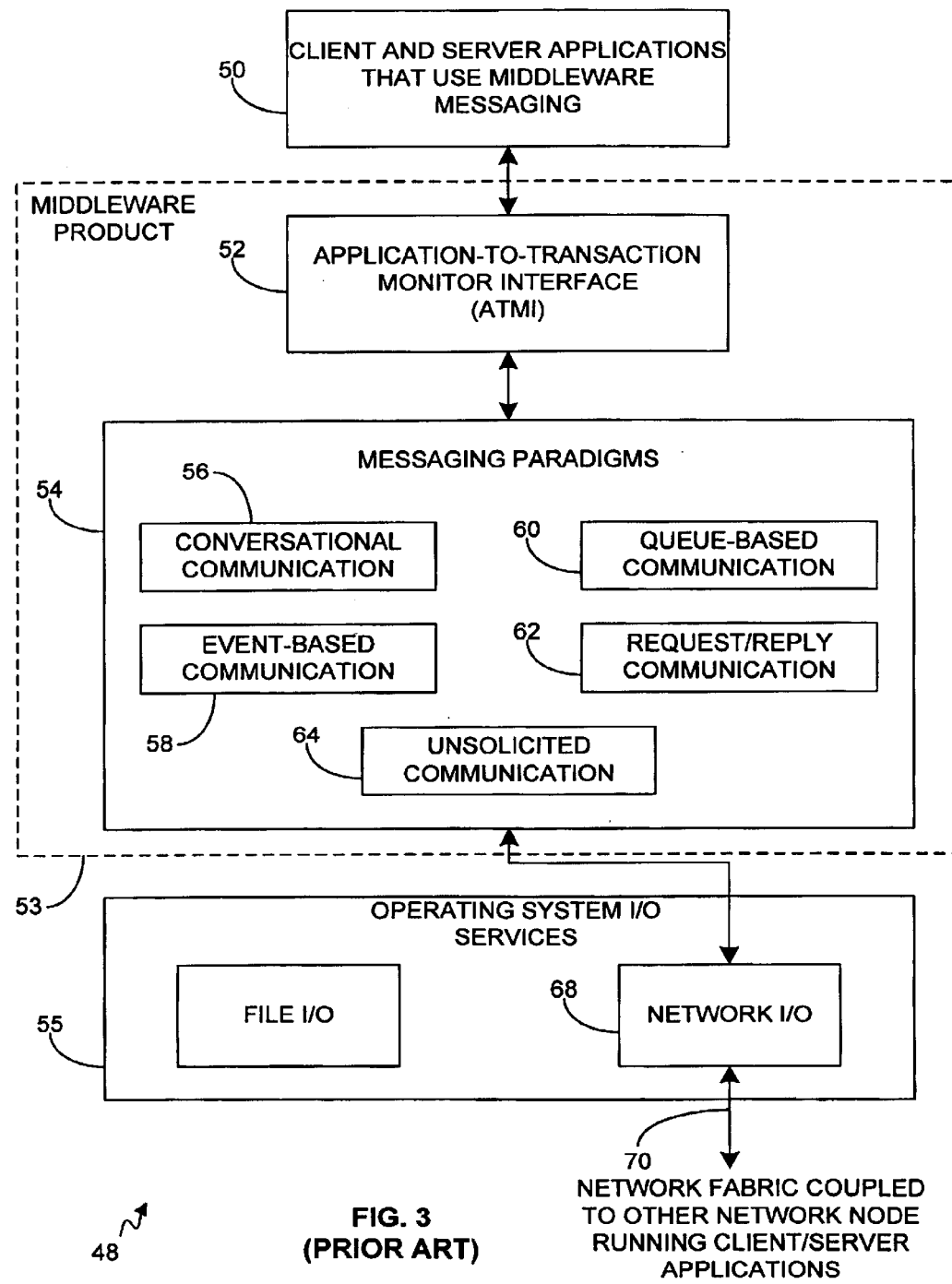
FIG. 3 is a block diagram of a prior art computer system that illustrates how messages are processed.

Before considering the present invention in greater detail, first consider how messages that are transmitted between network nodes are processed in a prior art computer using a middleware product such Bea Tuxedo®, which is a product of BEA Systems, Inc. FIG. 3 shows a prior art computer system 48. Client and server applications that use middleware messaging are represented by block 50. These applications pass messages to other nodes using an application-to-transaction monitor interface (ATMI), which is represented by block 52 and is part of middleware product 53. The ATMI provides a series of functions that may be called by the client and server applications to pass messages, as will be described in greater detail below.

The messaging paradigms supported by middleware product 53 are represented by block 54. The conversational communication paradigm is represented by block 56, the event-based communication paradigm is represented by block 58, the queue-based communication paradigm is represented by block 60, the request/reply communication paradigm is represented by block 62, and the unsolicited communication paradigm is represented by block 64. Block 54 communicates with the I/O services of the operating system, which are represented by block 55, to transmit messages. FIG. 3 illustrates how messages are transmitted between network nodes. Accordingly, block 54 communicates with network I/O block 68 to send and receive messages from other network nodes via network fabric 70.

Figure 4:
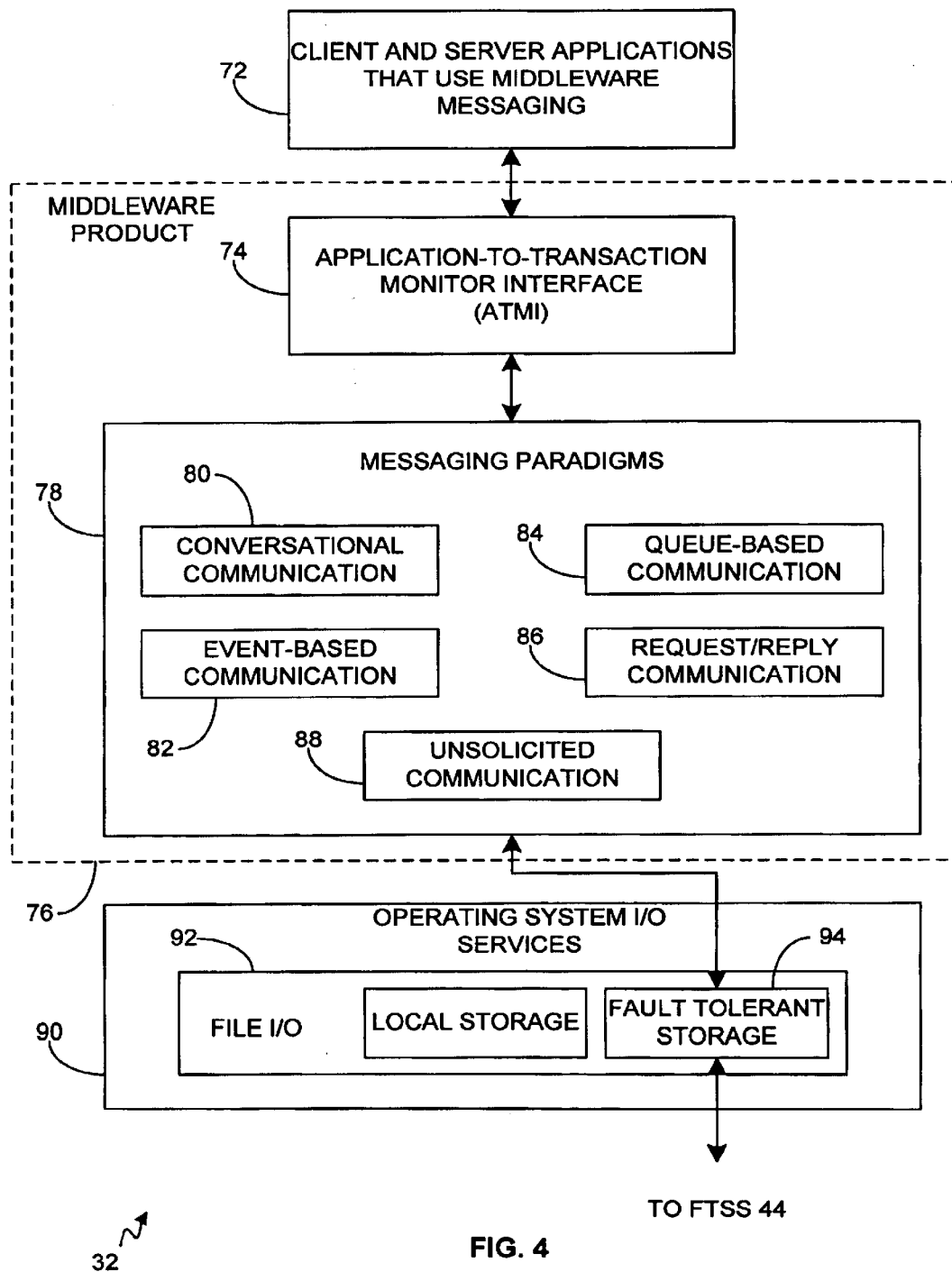
FIG. 4 is a block diagram of a computer system having a middleware product that passes messages to another computer system via a fault tolerant storage system (FTSS), in accordance with the present invention.

In accordance with the present invention, FIG. 4 shows how middleware product 76 is modified in computer system 32 of FIG. 2, as well as the other computer systems shown in FIG. 2, to pass messages via FTSS 44. Similar to prior art FIG. 3, client and server applications that use middleware messaging are represented by block 72. These applications pass messages to other nodes using an application-to-transaction monitor interface (ATMI), which is represented by block 74 and is part of middleware product 76. Note that all the function calls available in prior art ATMI 52 in FIG. 3 are available in ATMI 74, thereby providing complete compatibility with prior art applications.

The messaging paradigms supported by middleware product 76 are represented by block 78. The conversational communication paradigm is represented by block 80, the event-based communication paradigm is represented by block 82, the queue-based communication paradigm is represented by block 84, the request/reply communication paradigm is represented by block 86, and the unsolicited communication paradigm is represented by block 88. Block 78 communicates with the I/O services of the operating system, which are represented by block 90, to transmit messages. However, unlike messaging paradigms block 54 of FIG. 3, block 78 has been modified to pass messages between computer systems coupled to FTSS 44 by communicating with message agents in FTSS 44. Accordingly, block 78 communicates with fault tolerant storage block 94 of file I/O block 92, which is provided by operating system I/O services 90.

The communication between block 78 and FTSS 44 can be accomplished several ways. For example, a series of directories can be defined on FTSS 44 to store incoming and outgoing messages as files. Using this technique, block 78 can pass messages to FTSS 44 by writing messages as files into the appropriate directory of FTSS 44. Another way to accomplish this communication is to use the techniques disclosed in a co-pending application entitled "A Fault Tolerant Storage System Having an Interconnection Fabric That Also Carries Network Traffic" by Blaine D. Gaither et al., which is incorporated by reference above. This application teaches how a network protocol stack can be modified to route all network traffic between nodes coupled to the FTSS via the FTSS interconnection fabric. Using the techniques taught in this application, each message agent in FTSS 44 can be assigned an address, and block 78 can communicate with the network protocol stack to transmit the messages to FTSS 44. If this technique is used, the messages would first pass through the network protocol stack before being processed by fault tolerant storage block 94. Those skilled in the art will understand how to adapt the teachings herein to pass messages from messaging paradigms bock 78 to FTSS 44.

Figure 5:
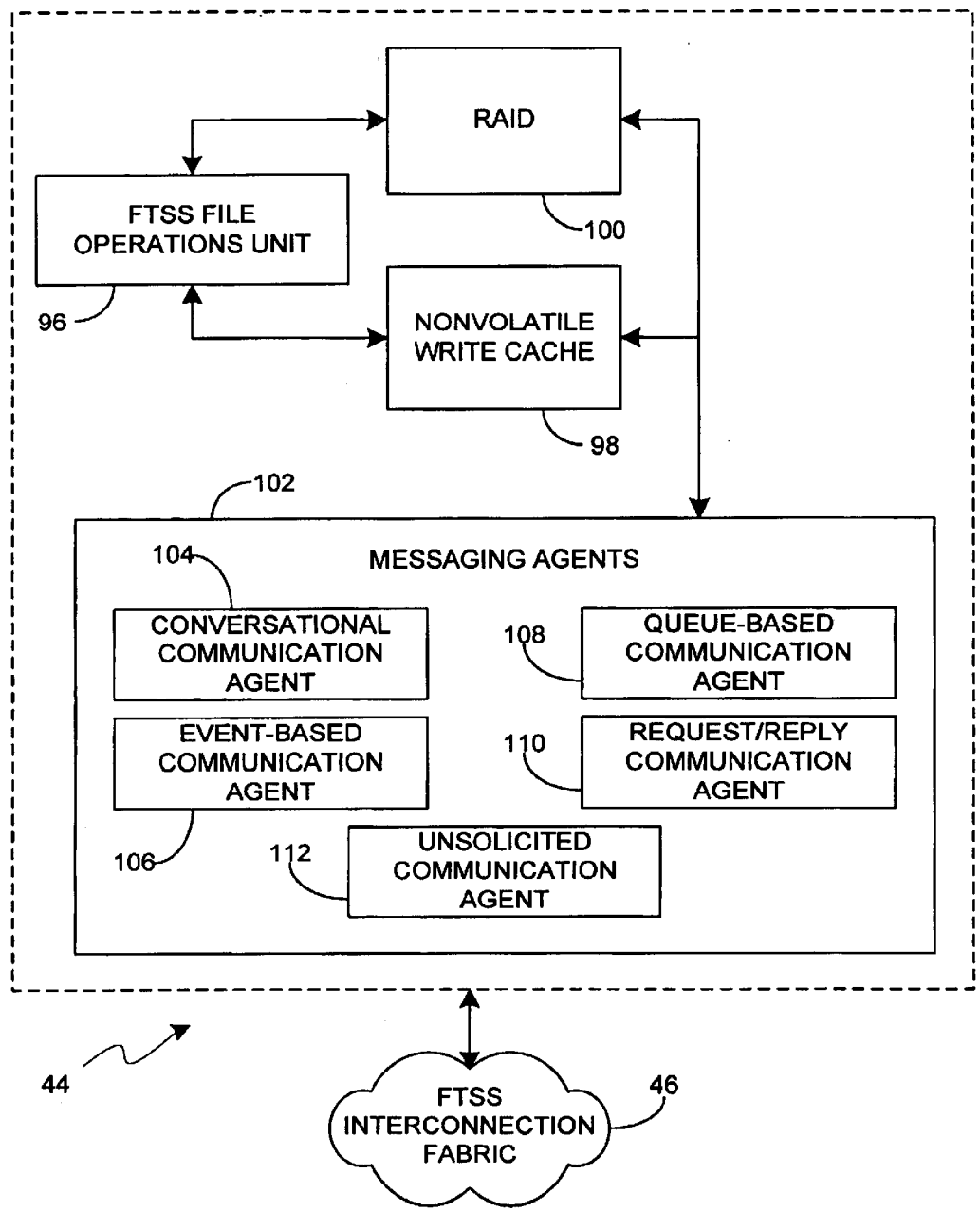
FIG. 5 is a block diagram of an FTSS that passes messages between client and server nodes via communication agents, in accordance with the present invention.

In accordance with the present invention, FIG. 5 illustrates how FTSS 44 can be modified to support messaging. In FIG. 5, FTSS 44 includes file operations unit 96, which processes file I/O requests in a manner similar to the prior art. Incoming file data is first committed to non-volatile write cache 98, and is then stored in RAID 100. Outgoing file data is retrieved from RAID 100, and then transmitted to the node that requested the file data.

Messaging agents block 102 includes several messaging agents that support the messaging paradigms described above. Accordingly, messaging agents block 102 includes conversational communication agent 104, event-based communication agent 106, queue-based communication agent 108, request/reply communication agent 110, and unsolicited communication agent 112.

In the following discussion, the communication agents will be described in greater detail. A variety of queues and other data structures will be illustrated. All of these data structures are stored in fault tolerant storage, such: as RAID 100 and/or nonvolatile write cache 98. In addition, all incoming messages are immediately stored in fault tolerant storage. Furthermore, the communication agents retain old message transactions for some time after the message transactions are complete. In some of the figures discussed below, old transactions will be illustrated, while in other figures, retention of the old transactions is assumed. Saving the old transactions allows any node engaged in messaging to recover from an error by "rolling back" to a known point in the message transaction, and reconstructing the transaction. Transactions can eventually be deleted using some mechanism known in the art, such as an expiration date and time or a FIFO queue. Since a typical FTSS can be configured with terabytes of data, the FTSS is will suited for retaining old message transactions.

Figure 6:
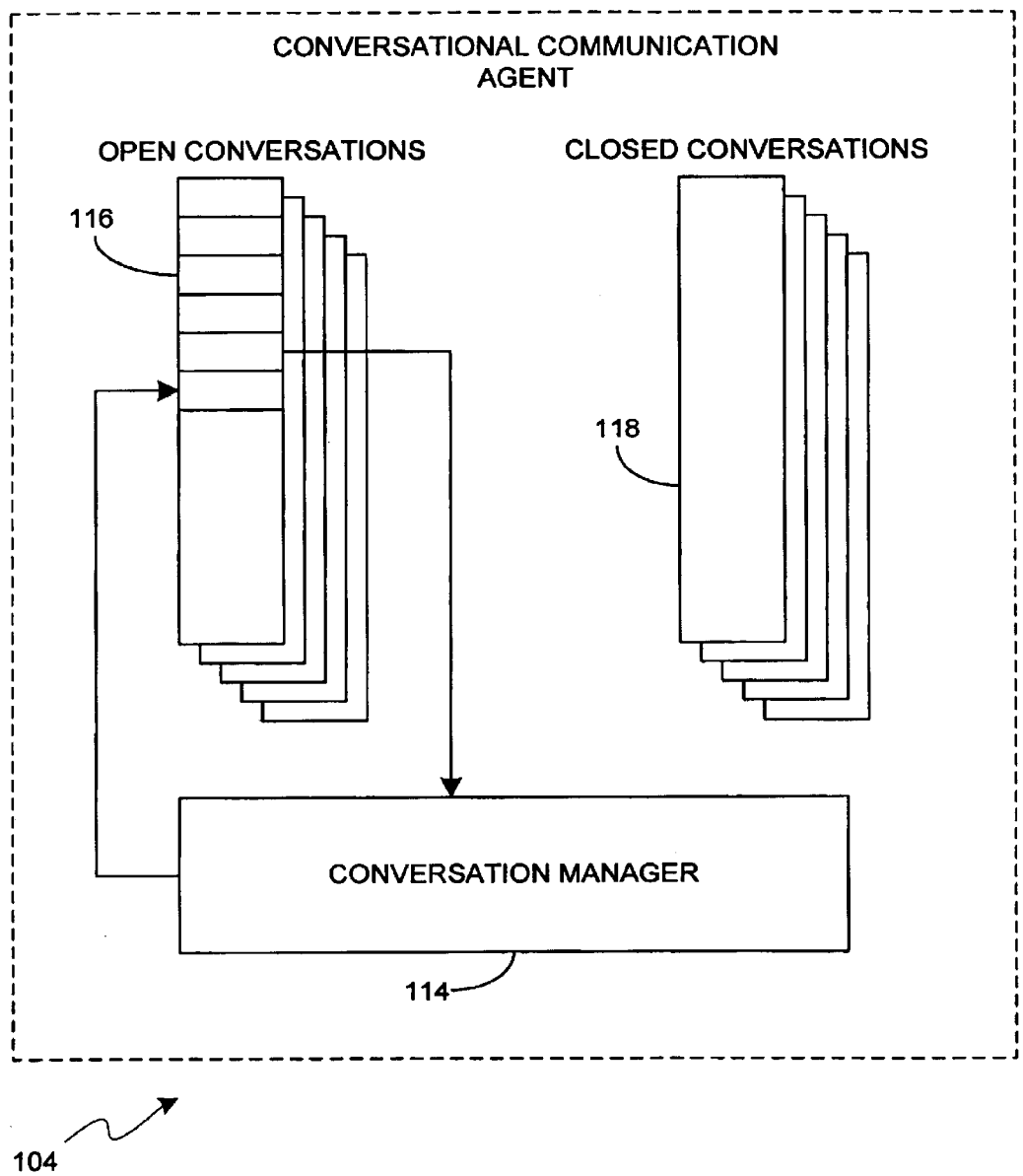
FIG. 6 is a block diagram illustrating a conversational communication agent provided in the FTSS of FIG. 5.

FIG. 6 is a diagram illustrating conversational communication agent 104. Before discussing agent 104 in greater detail, first consider the relevant ATMI function calls provided by block 74 in FIG. 4 that support conversational communication in a Bea Tuxedo® system. The C programming language version of these function calls will be discussed below, however analogous function calls are available in other languages, such as COBOL and Java.

The function tpconnect( ) is used to begin a conversation with another node, and the function tpdiscon( ) is used to end the conversation. To send a message in the conversation, the function tpsend( ) is used, and to receive a message in the conversation, the function tprecv( ) is used.

FIG. 6 illustrates conversation communication agent 104. Agent 104 includes a conversation manager 114, open conversations 116, and closed conversations 118. When a client node calls tpconnect( ) to open a conversation with a server node, conversation manager 114 creates an open conversation 116. When either node calls tpsend( ), the message in the conversation is stored in the appropriate open conversation 116, and is transmitted to the other node. Since the message is transmitted to the other node by manager 114, when the other node calls the function tprecv( ), the message is provided locally to program that called the tprecv( ) function. However, if the other node suffered some type of error or failure that caused it to lose the message, the message can still be retrieved from the appropriate open conversation 116. When either node calls tpdiscon( ), the conversation is closed and is moved to closed conversations 118, and is retained for a period of time, as discussed above. Accordingly, either node can "rollback" to a known point by accessing open conversations 116 or closed conversations 118. Note that in the prior art, conversations occurred directly between the client and server in a transient manner. By providing conversational communication agent 104 in FTSS 44, reliability and fault tolerance are increased because conversations are also retained in FTSS 44.

Figure 7:
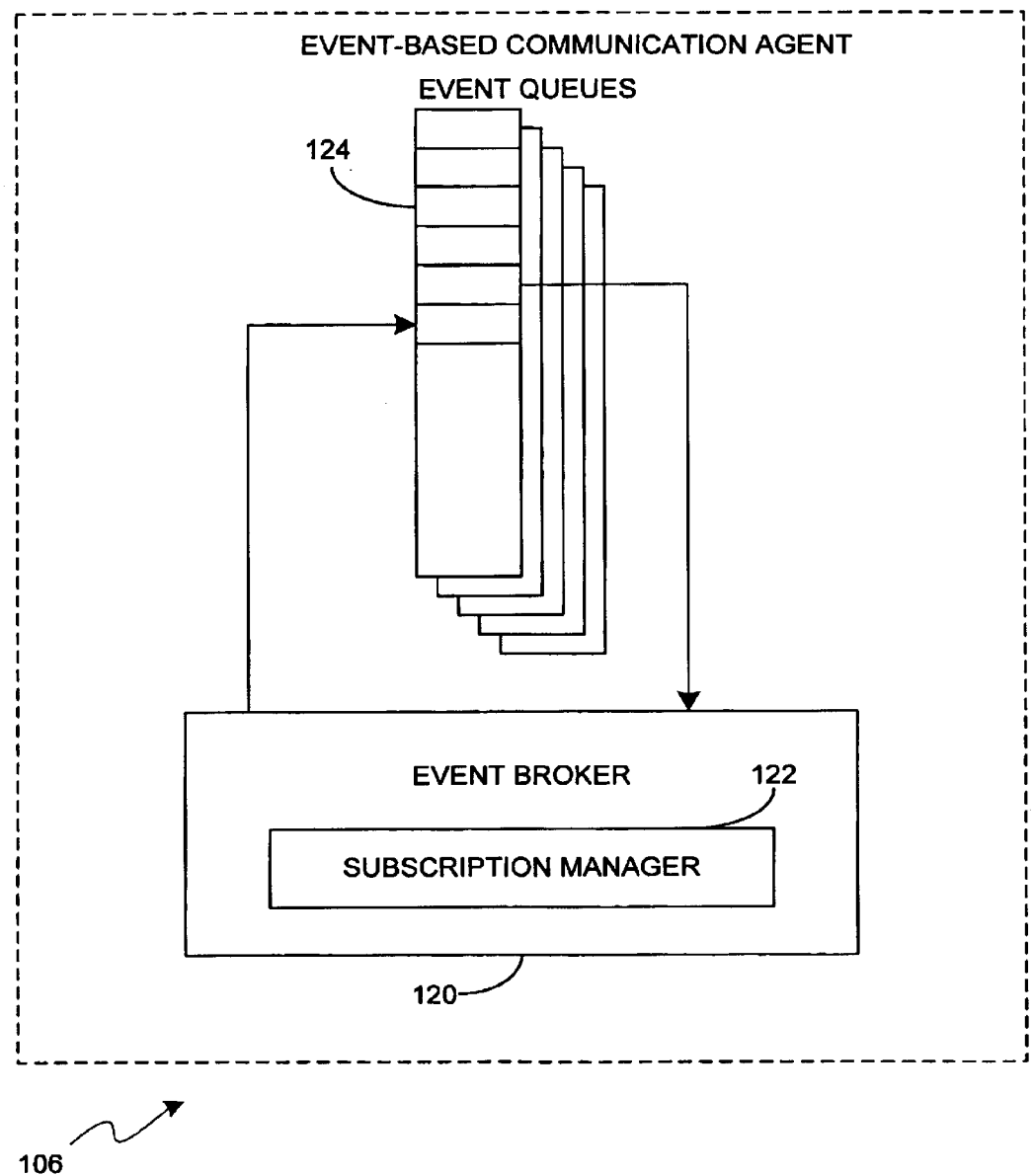
FIG. 7 is a block diagram illustrating an event-based communication agent provided in the FTSS of FIG. 5.

FIG. 7 is a diagram illustrating event-based communication agent 106. Before discussing agent 106 in greater detail, first consider the relevant ATMI function calls provided by block 74 in FIG. 4 that support event-based communication.

The function tpsubscribe( ) allows a client to subscribe to receive certain types of event messages, and the function tpunsubscribe( ) allows the client to unsubscribe. The function tppost( ) allows a server to post an event message.

In FIG. 7, event-based communication agent 106 includes an event broker 120, which includes a subscription manager 122, and event queues 124. Subscription manager 122 maintains lists of clients that have subscribed to certain events using the tpsubscribe( ) function call. When a server posts an event message using the tppost( ) function call, the message is posted in the appropriate event queue 124, and is relayed to all client nodes that have subscribed to the event. If a particular client suffers some type of error or other failure, the client can access event broker 120 to retrieve any event messages corresponding to events to which it has subscribed. In the prior art, an event broker was also provided on a server. However, the present invention increases reliability and fault tolerance by providing the event broker in FTSS 44. In a typical distributed application that includes an FTSS, the FTSS will typically be more reliable and fault tolerant than the servers coupled to the FTSS.

Figure 8:
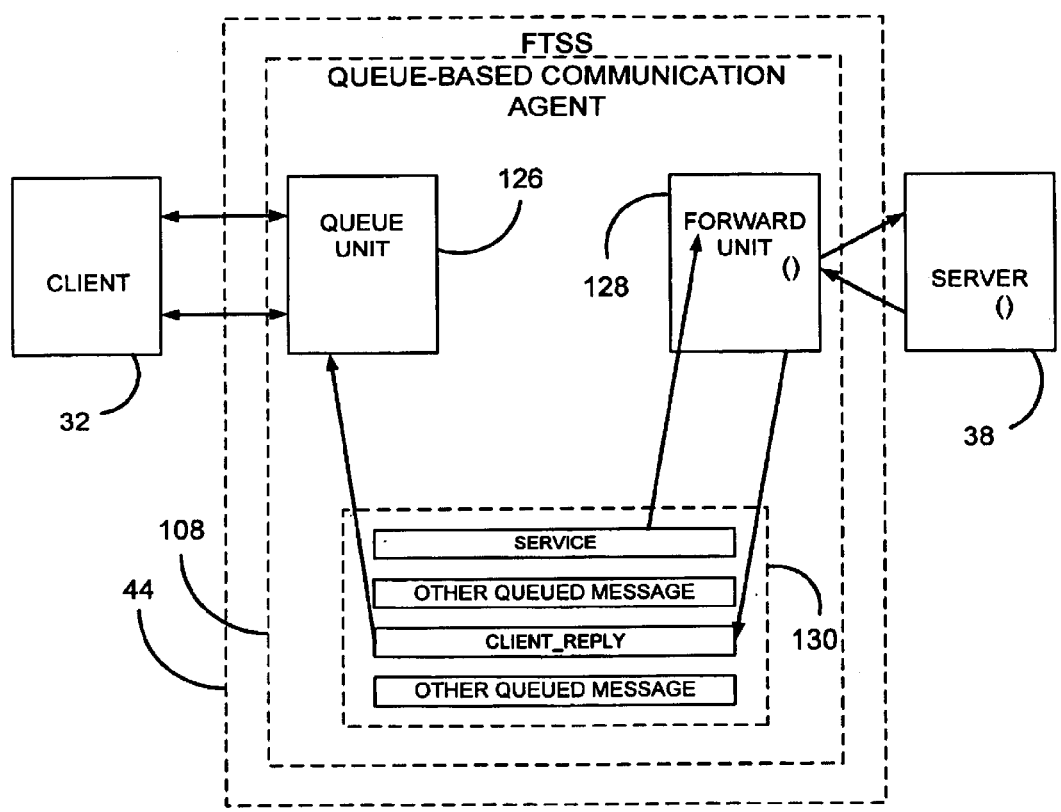
FIG. 8 is a block diagram illustrating a queue-based communication agent provided in the FTSS of FIG. 5.

FIG. 8 is a diagram illustrating queue-based communication agent 108. For reasons that will be come apparent below, this type of messaging is also known in the art as "store and forward" messaging. Before discussing agent 108 in greater detail, first consider the relevant ATMI function calls provided by block 74 in FIG. 4 that support queue-based communication. The function tpenqueu( ) enqueues a message to a message queue and the function tpdequeue( ) dequeues a message from the message queue.

In FIG. 8, a client application on computer system 32 of FIG. 2 seeks to execute a service of a server application on computer 38. First, the client calls the tpenqueue( ) function, which passes the service message to queue-based communication agent 108 on FTSS 44. Queue unit 126 enqueues the service message in queue space 130. Forwarding unit 128 dequeues the service message and forwards the message to the server application on computer system 38. Forwarding unit 128 communicates with the server application using request/reply communication, which will be described in greater detail below with reference to FIG. 9. Accordingly, forwarding unit 128 executed a tpcall( ) function to transmit the service message to computer system 38. The server application processes the service message and forms a client reply message, and returns the client reply message to forwarding unit 128 by calling a tpreturn( ) function. Forwarding unit 128 enqueues the client reply message in queue space 130. Sometime thereafter, the client application on computer system 32 calls the tpdequeu( ) function to retrieve the client reply message. Queue unit 126 retrieves the client reply message from queue space 130 and transmits the message to the client application of computer system 32.

In the prior art, a queue-based communication manager was also provided on a server. However, the present invention increases reliability and fault tolerance by providing the queue-based communication manager in FTSS 44. As mentioned above, in a typical distributed application that includes an FTSS, the FTSS will typically be more reliable and fault tolerant than the servers coupled to the FTSS.

Figure 9:
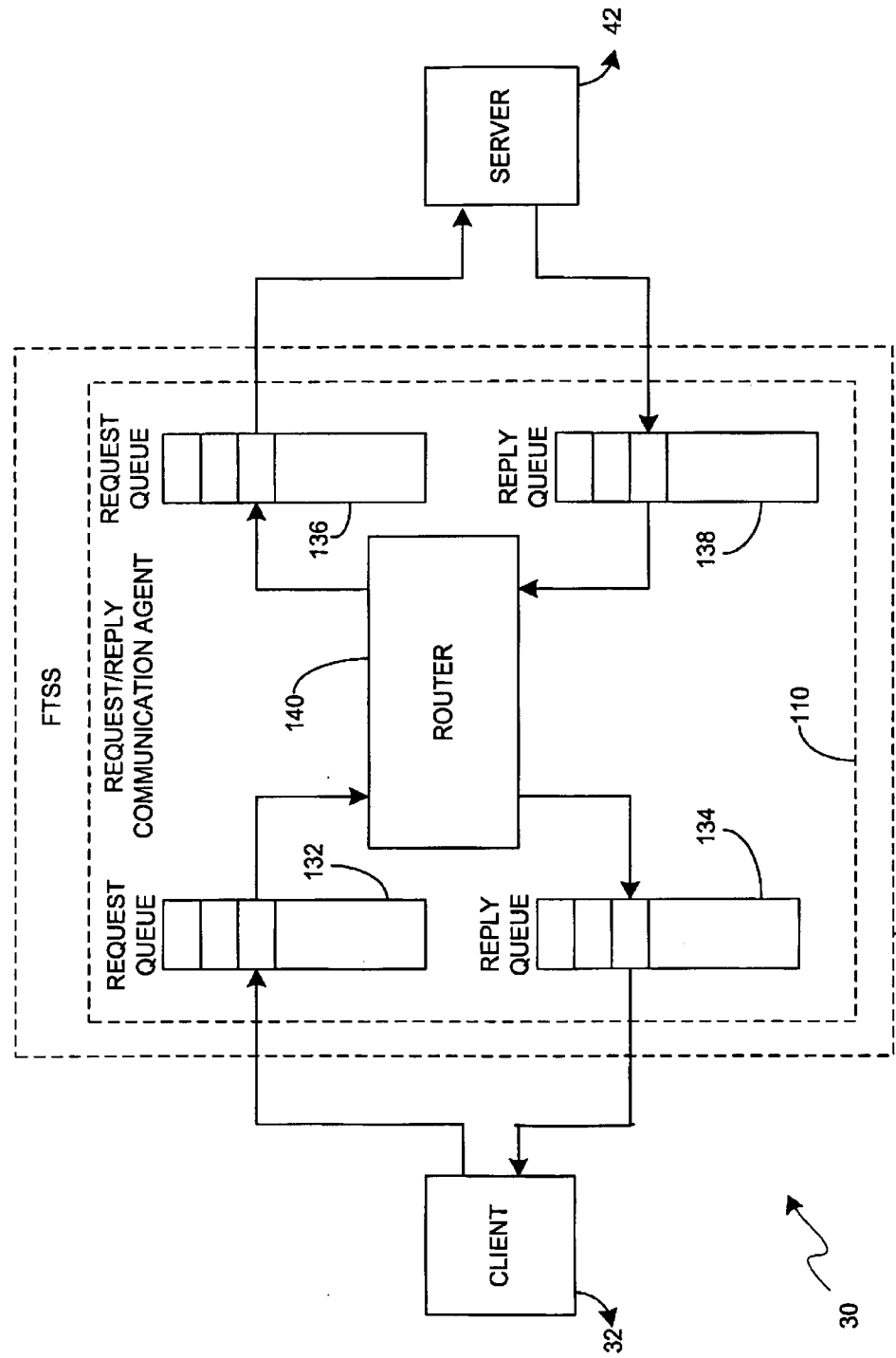
FIG. 9 is a block diagram illustrating a request/reply communication agent provided in the FTSS of FIG. 5.

FIG. 9 is a diagram illustrating request/reply communication agent 110. Before discussing agent 110 in greater detail, first consider the relevant ATMI function calls provided by block 74 in FIG. 4 that support queue-based communication. The function tpcall( ) is used to initiate a synchronous request/reply transaction to a service, and the function tpascall( ) is used to initiate an asynchronous request to a service. After the service is executed, the server application calls tpreturn( ) to return the reply message. As discussed above, in synchronous mode, a client sends a request to a server, which performs the requested action while the client waits. The server then sends the reply to the client, which receives the reply. In asynchronous mode, the client does not wait for a server to complete a service request before the client undertakes other tasks. Accordingly, a reply is implied with a tpcall( ) function in synchronous mode. In asynchronous mode, a reply is received by calling the tpgetrply( ) function. An asynchronous request can also be cancelled by calling the tpcancel( ) function.

As discussed above, prior art request/reply communication is also implemented using transient inter-process communication (IPC) message queues. Each server is assigned an IPC message queue called a request queue, and each client is assigned an IPC message queue called a reply queue. Accordingly, a client application can send requests to the server by putting those requests on the server's queue, and then check and retrieve messages from the server by retrieving messages from its own reply queue. The present invention provides request/reply communication with additional reliability and fault tolerance by replicating each IPC message queue in FTSS 44, and storing the contents of the IPC message queues in RAD 100 and/or nonvolatile write cache 98 of FIG. 5.

In FIG. 9, request/reply communication agent 110 maintains a request and reply queue for each request and reply queue present on a computer system configured to transmit messages between network nodes. Accordingly, request queue 132 and reply queue 134 correspond to queues in computer system 32, and request queue 136 and reply queue 138 correspond to queues in computer system 42. Router 140 routes the messages between the queues.

For example, assume that a client application on computer system 32 calls the tpcall( ) or tpascall( ) function to send a request message to a server application on computer system 42. The request message is transmitted to request queue 132. Router 140 receives the request message and routes it to request queue 136, and in turn the request message is transmitted to the server application on computer system 42. The server application processes the request message and calls the tpreturn( ) function to transmit the reply message back to the client application. The reply message is enqueued in reply queue 138. Router 140 routes the reply message to reply queue 134, and the reply message is retrieved by the client application in computer system 32.

Note that the method used to process messages in FIG. 9 can be applied to any type of inter-process communication. By intercepting and storing IPC messages within FTSS 44, an application can easily recover from an error or other type of failure by accessing agent 110 to receive messages from the queues.

Figure 10:
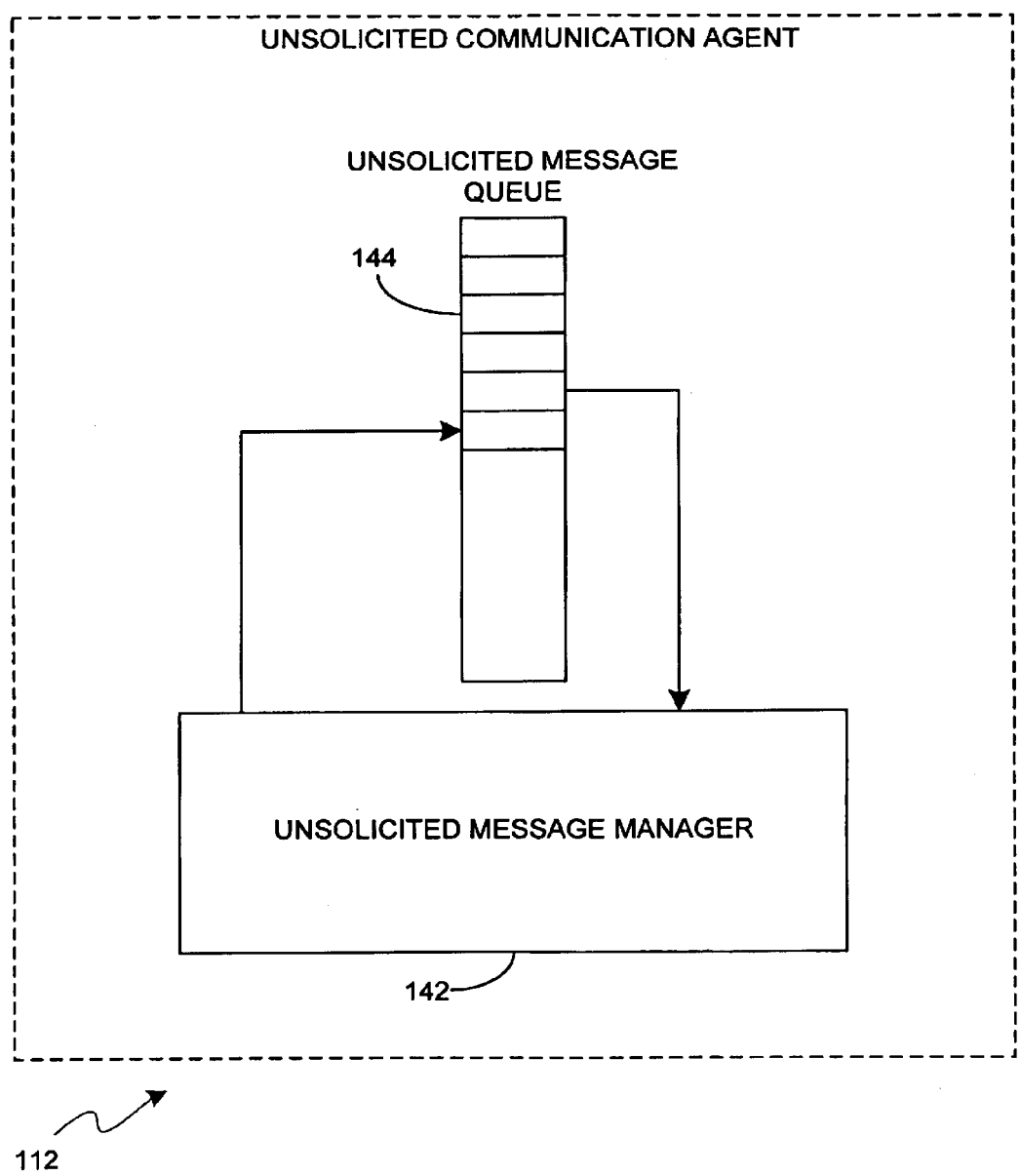
FIG. 10 is a block diagram illustrating an unsolicited communication agent provided in the FTSS of FIG. 5.

FIG. 10 is a diagram illustrating unsolicited communication agent 112. Before discussing agent 112 in greater detail, first consider the relevant ATMI function calls provided by block 74 in FIG. 4 that support event-based communication. The function tpnotify( ) sends an unsolicited message to a single client and tpbroadcast( ) sends a message to several clients. Note that unsolicited communication is similar to event-based communication, except that there is no subscription function.

In FIG. 10, unsolicited communication agent 112 includes an unsolicited message manager 142 and unsolicited message queue 114. When a server calls the tpnotify( ) or tpbroadcast( ) function, the message is posted in queue 144, and is relayed to the appropriate nodes. If a particular client suffers some type of error or other failure, the client can access unsolicited message manager 142 to retrieve any relevant unsolicited messages.

The present invention enhances the reliability and fault tolerance of messaging in several ways. First, messages may be transmitted between nodes using FTSS interconnection fabric 46 of FIG. 2. Fabric 46 is highly reliable and fault tolerant. Since many systems that host distributed applications already include an FTSS, using fabric 46 instead of a less reliable network media, such as Ethernet, increases availability of the distributed application without the customer having to incur additional hardware costs.

Second, in the prior art, several messaging paradigms, such as queue-based communication and event based communication, use agents that operate on separate servers. By moving these agents to the FTSS, availability is increased because the FTSS is typically more reliable than the servers to which it is coupled. Furthermore, since the FTSS is being used to pass messages anyway, providing the agents in the FTSS eliminates the need to route the messages to a separate server, thereby allowing the messages to be processed faster.

Finally, several prior art messaging paradigms, such as conversational communication and request/reply communication, pass IPC messages directly between nodes in a transient manner. In the present invention, these IPC messages pass through the FTSS and are stored in and retained by the FTSS, thereby allowing any application to "rollback" to a known point and retrieve lost IPC messages from the FTSS.

Although the present invention has been described with reference to preferred embodiments, workers skilled in the art will recognize that changes may be made in form and detail without departing from the spirit and scope of the invention.

What is claimed is:

1. A method of transmitting messages between a first node and a second node, wherein the first and second nodes are each coupled to a fault tolerant storage system (FTSS), the method comprising:
   transmitting a message from the first node to a communication agent in the FTSS;
   storing the message in a data structure in highly reliable fault-tolerant storage media of the FTSS;
   processing the message at the FTSS in accordance with a messaging paradigm; and
   transmitting the message from the FTSS to the second node.

2. The method of claim 1 wherein the messaging paradigm is a request/reply communication paradigm, and:
   transmitting a message from the first node to a communication agent in the FTSS comprises:
      transmitting a request message from the first node to a request/reply communication agent in the FTSS;
   storing the message in a data structure in highly reliable fault-tolerant storage media of the FTSS comprises:
      storing the request message in a request queue in highly reliable fault-tolerant storage media of the FTSS;
   processing the message at the FTSS in accordance with a messaging paradigm comprises:
      retrieving the request message from the request queue; and
   transmitting the message from the FTSS to the second node comprises:
      transmitting the request message from the FTSS to a service on the second node;
      and the method further comprises:
         executing the service on the second node using the request message as an input
            and providing a reply message as an output;
               transmitting the reply message from the second node to the request/reply
               communication agent in the FTSS;
         storing the reply message in a reply queue in highly reliable fault-tolerant storage
            media of the FTSS;
         retrieving the reply message from the reply queue; and
         transmitting the reply message from the FTSS to the first node.

3. The method of claim 1 wherein the messaging paradigm is a conversational communication paradigm, and:
   transmitting a message from the first node to a communication agent in the FTSS comprises:
      transmitting a connect message from the first node to a conversational communication agent in the FTSS;
   processing the message at the FTSS in accordance with a messaging paradigm comprises:
      opening a conversation queue in highly reliable fault-tolerant storage media of the FTSS;
   storing the message in a data structure in highly reliable fault-tolerant storage media of the FTSS comprises:
      storing the connect message in the conversation queue; and
   transmitting the message from the FTSS to the second node comprises:
      transmitting the connect message from the FTSS to the second node.

4. The method of claim 3 and further comprising:
   transmitting a send message from the first node to the conversational communication agent in the FTSS;
   storing the send message in the conversation queue;
   transmitting the send message to from the FTSS to a service on the second node;
   executing the service in the second node using the send message as an input and providing a receive message as an output;
   transmitting the receive message from the second node to the conversational communication agent in the FTSS;

storing the receive message in the conversation queue; and transmitting the receive message to the first node.

5. The method of claim 3 and further comprising:

transmitting a disconnect message from the first node to the conversational communication agent in the FTSS;

closing the conversation queue; and transmitting the disconnect message to the second node.

6. The method of claim 1 wherein the messaging paradigm is an event-based communication paradigm, and:

transmitting a message from the first node to a communication agent in the FTSS comprises:
transmitting a post message from the first node to an event-based communication agent in the FTSS;

processing the message at the FTSS in accordance with a messaging paradigm comprises:
accessing a subscription manager to determine whether any nodes have subscribed to receive the event represented by the post message;

storing the message in a data structure in highly reliable fault-tolerant storage media of the FTSS comprises:
storing the post message in an event queue in highly reliable fault-tolerant storage media of the FTSS; and transmitting the message from the FTSS to the second node comprises:
transmitting the post message from the FTSS to the second node if the
second node has subscribed to receive the event represented by the post message.

7. The method of claim 6 and further comprising:

transmitting a subscribe message from the second node to the event-based communication manager in the FTSS, wherein the subscribe message includes an event; and accessing the subscription manager to record that the second node has subscribed to receive post messages associated with the event.

8. The method of claim 6 and further comprising:

transmitting an unsubscribe message from the second node to the event-based communication manager in the FTSS, wherein the unsubscribe message includes an event; and accessing the subscription manager to record that the second node should no longer receive post messages associated with the event.

9. The method of claim 1 wherein the messaging paradigm is a queue-based communication paradigm, and:

transmitting a message from the first node to a communication agent in the FTSS comprises:
transmitting an enqueue message from the first node to a queue-based communication agent in the FTSS;

storing the message in a data structure in highly reliable fault-tolerant storage media of the FTSS comprises:

storing the enqueue message in a queue space in highly reliable fault tolerant storage media of the FTSS;

processing the message at the FTSS in accordance with a messaging paradigm
comprises:
retrieving the enqueue message from the queue space only if the second
node is available; and transmitting the message from the FTSS to the second node comprises:
transmitting the enqueue message from the FTSS to a service on the second
node only if the second node is available;

and the method further comprises:
executing the service on the second node using the enqueue message as an input
and providing a dequeue message as an output;
transmitting the dequeue message from the second node to the queue-based
communication agent in the FTSS;

storing the dequeue message in the queue space;

retrieving the dequeue message from the queue space; and transmitting the dequeue message from the FTSS to the first node.

10. The method of claim 1 wherein the messaging paradigm is an unsolicited communication paradigm, and:

transmitting a message from the first node to a communication agent in the
FTSS comprises:
transmitting a broadcast message from the first node to an unsolicited
communication agent in the FTSS;

processing the message at the FTSS in accordance with a messaging paradigm
comprises:
accessing determining which nodes should receive the broadcast message
based on the broadcast message;

storing the message in a data structure in highly reliable fault-tolerant storage
media of the FTSS comprises:
storing the broadcast message in an unsolicited message queue in highly
reliable fault-tolerant storage media of the FTSS; and transmitting the message from the FTSS to the second node comprises:
transmitting the post message from the FTSS to all nodes that should
receive the broadcast message.

* * * * *